March 11, 1958 E. B. THURSTON ET AL 2,826,751
FLOOR CALL REGISTERING CIRCUITS
Filed March 16, 1954 2 Sheets-Sheet 1
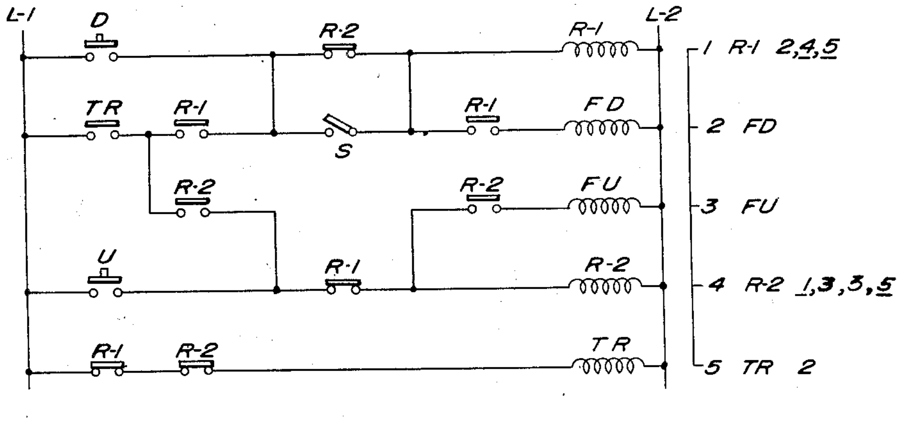
Fig I
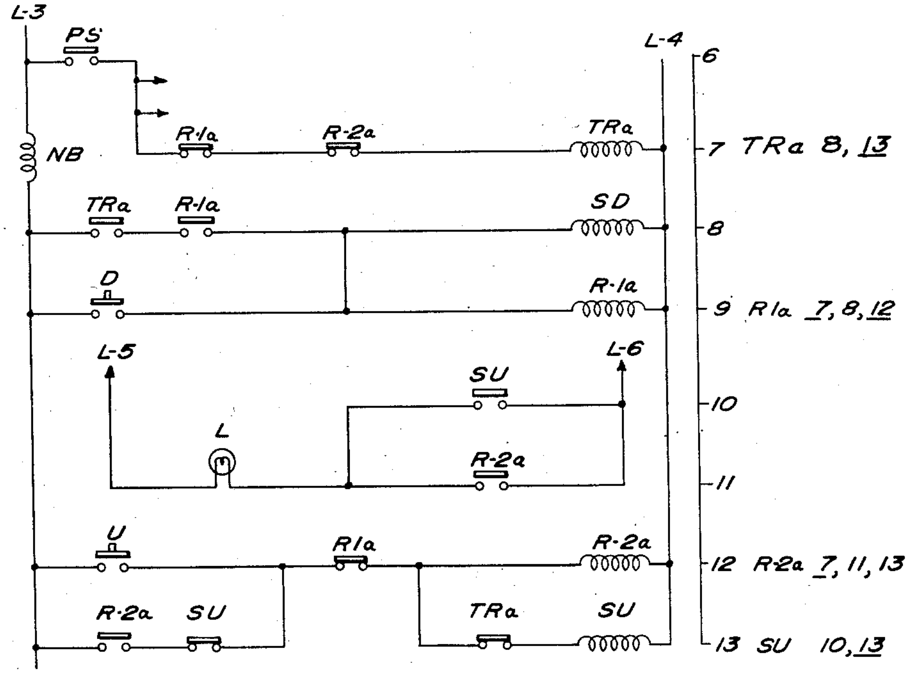
Fig II
INVENTOR.
ERNEST B. THURSTON
WALTER A. NIKAZY
BY
Marshall, Marshall & Yeasting
ATTORNEYS March 11, 1958 E. B. THURSTON ET AL 2,826,751
FLOOR CALL REGISTERING CIRCUITS
Filed March 16, 1954 2 Sheets-Sheet 2
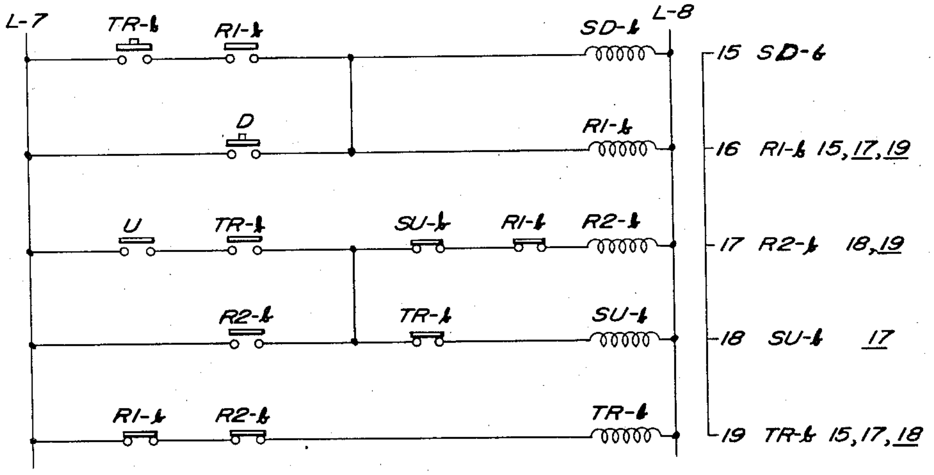
Fig. III
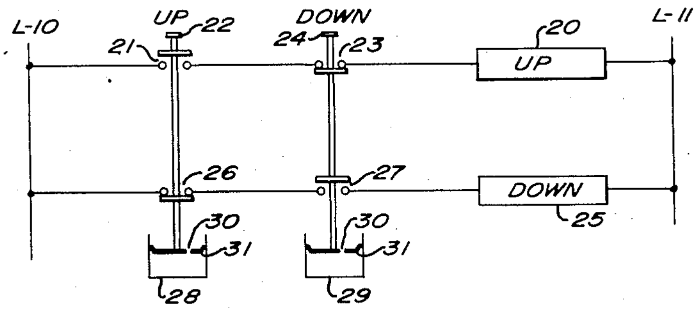
Fig. IV
INVENTOR.
ERNEST B. THURSTON
WALTER A. NIKAZY
BY
Marshall, Marshall & Yeasting
ATTORNEYS United States Patent Office 2,826,751
Patented Mar. 11, 1958

2,826,751

FLOOR CALL REGISTERING CIRCUITS

Ernest B. Thurston and Walter A. Nikazy, Toledo, Ohio, assignors to Toledo Scale Corporation, Washington Township, Ohio, a corporation of Ohio Application March 16, 1954, Serial No. 416,522
12 Claims. (Cl. 340—19)

This invention relates to automatic elevators and particularly to the circuits employed to register floor calls.

Many persons are careless when registering floor calls in that they intentionally or unintentionally push both buttons as they register their call. Pushing both of the buttons thereby registers a true call, the call for service in which the passenger wishes to go, and a false call, the call for service in the opposite direction. In signal control elevators whether they be operated by an attendant or be completely automatic the calls as registered are stored in floor call storing means and the calls remain stored until a car stops in response to the call. If the cars are operated by attendants, the registration of false calls, while it slows up the operation to a certain extent, is not unduly serious. It merely means that the car will lose approximately four seconds for each such false call. If the cars are operated without attendants and the usual standing time for each call is allowed the cars will lose nearly ten seconds for each false call. It is therefore important if heavy traffic is to be handled by completely automatic elevators that the number of false calls be reduced to an aboslute minimum.

The principal object of this invention is to provide floor call circuit means arranged such that simultaneous or quickly successive pushing of both hall buttons will register a single call.

Another object of the invention is to provide hall call circuit means arranged such that simultaneous or quickly successive pushing of both buttons results in a call for a preferred direction only.

Another object of the invention is to provide floor call circuit means arranged such that the registration of a down call within a predetermined short interval after the pushing of the up call button will cancel the up call and result in a down call only.

More specific objects and advantages are obtained from circuits embodying the invention.

According to the invention timing means responsive to the manual operation of either of the push button floor call switches is effective to disable the circuit to the opposite direction floor call storing means for a limited period of time. The timing means may be pneumatic, hydraulic, or entirely electrical. In general it is desirable to register a call in a predetermined direction upon simultaneous or quickly successive pushing of both hall buttons. Ordinarily the calls so registered should be in the direction that most of the passengers wish to go. In the preferred form of the invention, since it is impossible always to accurately determine the order when the buttons are nearly simultaneously pushed such rapid successive pushing is caused to register a call in the direction of predominate traffic. To accomplish this an intermediate circuit is employed with a timing relay for setting up calls in the opposite or light traffic direction and such intermediate circuit during the timing interval may be interrupted by the registering of a call in the opposite direction. In addition the circuit for registering calls in the light traffic direction is held interrupted for a short time interval after the registration of a call in the heavy traffic direction so as to prevent false calls should the light direction call closely follow the other. The circuits are preferably arranged so that the delay feature may be switched in or out of the circuit according to the passenger habits and the amount of traffic expected.

Circuits embodying the invention are illustrated in the accompanying drawings.

In the drawings:

Figure I is a wiring diagram of a control circuit in which the first button to be pushed registers its call and a predetermined time interval must elapse before a call in the opposite direction can be registered.

Figure II shows a circuit in which only a call in the predominate traffic direction is registered if that button is pushed within a short time interval before or after the pushing of the button for a call in the light traffic direction.

Figure III shows another version of the circuit shown generally in Figure II.

Figure IV shows a simple arrangement of hall call circuits with pneumatic control means for measuring the time intervals.

In the following description it will be assumed that the heavy traffic is in the down direction and that it is desired ordinarily to register a down signal in preference to an up signal. The circuits however, may be easily altered to reverse the directional preference so that simultaneous operation of the buttons will result in a signal for the up direction.

In the following circuits only the energizing coils of the floor call registering or storing means are shown. The floor call storing means are conventional and may be of the two coil relay type either latch relays or opposed coil relays. In a latch relay one coil releases the relay and the other coil resets it while in the opposed coil relays energization of a first coil causes the relay to close thereby sealing itself in by current flow through contacts of the relay and the relay is released by current flow through the second coil which neutralizes the magnetic field. These floor call storing means, regardless of which type are employed, are reset or returned to their unenergized condition whenever the call for that particular floor is answered by the elevator system.

In the following diagrams similar reference characters are employed for relay operating coils and the contacts operated by such coils. The contacts operated by a particular coil may be quickly located by reference to the coding along the right side of each diagram wherein the diagram line numbers where the contacts occur are specified. The contacts are further identified by underscoring those reference characters referring to normally closed contacts, i. e. those contacts that are closed when the relay is de-energized.

Referring to Figure I a floor call storing means FD shown in line 2 may be energized to register a down call by momentarily pushing a push button D in line 1 so as to complete a circuit from a supply lead L1 through the push button switch D in line 1 and then through normally closed R2 contacts in line 1 to a relay coil R1 in the same line. Relay R1 thereupon closes its contacts R1 in line 2 thereby completing a circuit to energize the coil of the floor call storing means FD. It should be noted that this circuit cannot be completed unless the R2 relay contacts in line 1 are closed.

Likewise up calls may be registered on an up floor call storing means FU shown in line 3 by current flow from the lead L1 through a manually operated push button switch U in line 4, through relay contacts R1 in line 4, and relay coil R2 in line 4. Relay R2, upon being energized, closes its contacts R2 in line 3 thereby completing the circuit to the coil of the storing means FU to energize the floor call storing means FU in line 3.

To prevent the registering of both calls should the two push button switches U and D in lines 1 and 4 respectively be simultaneously pushed, a magnetic flux decay timing relay TR is provided. This relay, shown in line 5, is energized through R1 and R2 contacts shown in line 5. Its contacts TR in line 2 are used in combination with R1 contacts in line 2 and R2 contacts in line 3 to establish a holding circuit to the R1 or R2 relay once it has been energized without the other relay being energized. This may occur for the down relay R1 if the down push button in line 1 is operated first. Under this condition relay R1 seals itself in through the timer relay contacts TR and the R1 contacts in line 2. R1 being sealed in holds its contacts R1 in line 4 open so that the relay R2 and the up floor call storing means cannot be operated even though the push button U in line 4 be operated. When relay R1 was energized it opened its contacts R1 in line 5 thereby de-energizing the timer relay coil. Opening this circuit de-energizes the coil of the timer relay but it, being of the flux decay type, does not immediately respond and therefore its contacts TR in line 2 remain closed for an appreciable time interval after the coil TR in line 5 is de-energized. During this time interval the relay R1, being the first one to be closed, is held by its sealing circuit so that relay R2 and the up floor call storing means cannot be energized. At the end of the timing interval the timing relay releases thereby opening its contacts TR and the circuit in line 2 to de-energize the relay R1. The circuit is then ready to receive further calls.

If the up button U in line 4 be pushed without simultaneously pushing the down button D the circuit is completed to the relay R2 in line 4 and through its contacts R2 to the up floor call storing means FU in line 3. This relay R2 thereupon seals itself in through the timer relay contacts in line 2 and the relay contacts R2 in line 3. Relay R2 by opening its contacts in line 1 prevents re-energization of the R1 relay by subsequent operation of the down push button switch D. It should be noted that the timer relay in line 5 was energized for a second timing interval as soon as contacts R1 and R2 were simultaneously closed.

In this particular arrangement, because of the R1 contacts in line 4 and the R2 contacts in line 1, it is impossible to simultaneously energize relays R1 and R2. However, simultaneous pushing of the push buttons switches will result in one or the other of the relays being energized. The corresponding call is registered and the time delay must elapse before a further operation of the circuit may occur. Assume that a down call was registered by operation of relay R1 and after the time interval the next operation of the push buttons was such that the down push button D was operated slightly ahead of the up push button U in line 4. Thereupon the relay R1 would again be energized thus again preventing operation of the R2 relay. Therefore whether or not calls have been registered the circuit each time responds to the first button to be pushed when the two are pushed simultaneously or in quick succession and the second one to close its contacts is ineffective to register a signal.

It may be desirable to permit the circuit to register a down call even though the up button has just been pushed. This may be done by adding a switch S in line 2 so as to by-pass the contacts R2 in line 1. As long as the switch S is closed the down push button switch D in line 1 is always effective to operate the R1 relay and register a call at any time even though the relay R2 in line 4 is still subject to control of the relay R1.

If it is not necessary to have the relays R1 and R2 individually responsive to the first button pushed the contacts R2 in line 1 and the switch S in line 2 may be eliminated and the push button switch D in line 1 may be connected directly to the relay R1.

Figure II shows a similar circuit arranged to provide protection against the registration of unintentional or false hall calls. This circuit differs from that previously described in that provision is made for switching the circuit into or out of operation as desired and preference is always given to signals in a first direction whether the buttons be pressed simultaneously or in quick succession. This circuit differs from that first described in that a signal for the light traffic direction is not immediately registered but is temporarily stored in an auxiliary circuit. Should a signal for the heavy traffic direction be registered before the expiration of the short time interval the intermediately stored light direction signal is canceled and its push button must again be operated at a later time to establish the signal. By this additional feature the heavy traffic direction signal is always registered if the buttons are quickly successively pushed regardless of the sequence in which they are pushed.

In the circuit of Figure II a timing relay TR*a* in line 7 is continuously energized from a lead L3 by way of program selector switch contacts PS in line 6 and through normally closed contacts R1*a* and R2*a* in line 7. Corresponding timers for other floors are energized through the same program selector switch PS as is indicated by the arrow headed leads taken off the connection to the program selector switch.

Down direction calls, it being assumed that the down direction is the heavy traffic direction, are registered by closing a push button switch D in line 9 so that current may flow from the supply lead L3 through a night bell relay coil NB, through the contacts of the push button switch D in line 9 and then through the energizing coil of the down direction floor call storing means SD in line 8. Simultaneously current also flows through the coil of the relay R1*a* in line 9. Current flow through the floor call storing means SD causes it to register the down call This call remains registered until answered by a car.

Energization of the relay R1*a* in line 9 causes it to close its contacts R1*a* in line 8 and open its contacts R1*a* in lines 7 and 12. The opening of the contacts R1*a* in line 7 de-energizes the timing relay TR*a* to start the timing interval during which the system is insensitive to calls in the opposite direction. The closing of the R1*a* contacts in line 8 completes a holding circuit through the contacts TR*a* of the timing relay and the R1*a* contacts in line 8 to relay coil R1*a* in line 9. At the same time the opening of the contacts R1*a* in line 12 prevents energization of a relay R2*a* in line 12 should the up or light traffic direction push button switch U in line 12 be operated.

At the end of the timing interval determined by the timer relay TR*a* it releases its armature thereby opening its contacts in line 8 to de-energize the relay R1*a* and simultaneously closes its contacts TR*a* in line 13. If the up push button switch U in line 12 is held depressed and the down button released at this time an up call is immediately registered by current flowing through the up push button switch in line 12, the now closed contacts R1*a* in the same line and the now closed timer relay contacts TR*a* in line 13 to energize the tripping or energizing coil of the up directional floor call storing means SU in line 13.

If no calls have been recently registered the timing relay TR*a* in line 7 is energized so that the circuit is immediately responsive to down directional signals and if the down button is not pushed is immediately responsive to an up signal by way of the contacts of the push button switch U in line 12, now closed relay contacts R1*a* and relay coil R2*a* in line 12. The up direction storing means SU is not immediately energized, however, because the timing relay has opened its contacts TR*a* in line 13. The relay R2*a* to provide an intermediate call storing circuit, seals itself in by way of contacts R2*a* and SU in line 13 and the contacts R1*a* in line 12 and opens its contacts R2*a* in line 7 to de-energize the timer relay TR*a*. This timer relay thereupon starts its timing interval and at the expiration thereof closes its contacts in line 13 to energize the floor call storing means SU. As soon as the floor call storing means SU is energized it opens its contacts SU in line 13 to de-energize the relay R2*a* and its own energizing coil.

Should a down call be registered during the timing interval, i. e. very soon after the pushing of the up push button, current flow through the down push button switch D in line 9 energizes the relay R1*a* in line 9 whether or not a down direction signal has previously been stored in the storing means SD in line 8. Operation of the relay R1*a* opens its contacts R1*a* in line 12 thereby interrupting current flow to the relay R2*a* and de-energizing it before the timer relay has had a chance to close its contacts in line 13. This cancels the up or light direction signal which might have resulted from a quick successive pushing of the buttons with the up button being pushed ahead of the down button.

If the program selector switch in line 6 be open the timing relay TR*a* is de-energized so that its contacts in line 13 are closed. Under this condition both the up push button switch in line 12 and the down push button switch D in line 9 are immediately effective to register a call. The only limitation is that if the down button is pushed first and held depressed it will energize the relay R1*a* in line 9 so as to break the circuit in line 12 thereby rendering the up push button ineffective as long as the down button is held depressed.

Preferably the timing interval for the timer TR*a* is adjusted for two or three seconds. It may be desirable under certain conditions to extend this time. Ordinarily, however, impatient passengers will not stand with their hands on the buttons but will merely push them quickly and then release them so that two seconds is ample time to prevent the registration of false calls.

The registration of up calls may be indicated by a signal lamp L shown in line 11 immediately above the up push button switch U. This lamp, which is mounted within the push button so as to shine through a translucent portion of the button, is energized from low voltage supply leads L5, L6 by way of parallel connected contacts SU in line 10 and R2*a* in line 11. Therefore, as long as a call is registered by the storing means SU or the relay R2*a* is energized the lamp will be illuminated. Should an up call in progress of being registered be canceled by the quickly successive pushing of the down push button D in line 9 so as to release the relay R2*a* before the expiration of the time interval the lamp L will be extinguished thus indicating the cancelation of the call. A similar signal lamp, not shown, may be employed in the down push button switch D of line 9 and energized from the same low voltage source by way of contacts of the down direction floor call storing means SD of line 8.

This circuit provides protection against registration of false calls resulting from the simultaneous pushing of both the hall call buttons as long as the program selector switch is closed. The down call only is registered regardless of which button is pushed first provided that the two are pushed within the timing interval of the timing relay. This protection against false calls is effective whether or not a down call has been previously registered and still remains unanswered since the timing interval is started each time regardless of whether or not a call has been previously registered.

Figure III shows a similar arrangement except that provision is made so that floor calls in the light traffic direction cannot be registered until a certain predetermined time interval following the registration of a down call. In the circuit shown in Figure II, if the up button was held depressed the up call was registered in the storing means as soon as the timing relay timed out. The circuit in Figure III provides an additional time interval by requiring a re-energization of the timing relay before a signal can be stored in the intermediate circuit.

To accomplish this in addition to the circuits shown in Figure II a set of contacts of a timing relay TR*b* in line 19 are included in series with up push button switch contacts U in line 17. Thus to energize an auxiliary up call relay R2*b* it is necessary that the timing relay be energized and that a down push button switch D, line 16, be released long enough so that its relay R1*b*, line 16, is also released.

The sequence of operation of the various relays shown in Figure III under conditions where an intending passenger pushes the two buttons either simultaneously or in quick succession and then holds the up push button depressed continuously for a time interval thereafter is as follows: Assume that the up push button switch U in line 17 is depressed first and that the down push button D in line 16 is pressed very soon thereafter and then immediately released, the passenger holding the up push button closed. First, a circuit is completed through the up push button contacts U and timer relay contacts TR*b* in line 17 to energize relay R2*b* in line 17 by way of the relay contacts R1*b* and floor call storing means contacts SU*b*. Energization of this relay R2*b* causes it immediately to open its contacts R2*b* in line 19 to de-energize the timer relay TR*b* and start the timing interval. If nothing more were done, that is if the down button were not pressed, the up auxiliary relay R2*b* having sealed itself in by way of its contacts R2*b* in line 18 remains energized and at the expiration of the timing interval when the timer relay contacts TR*b* in line 18 close the up signal is finally registered in the storing means SU*b*. Upon registration of this signal contacts SU*b* in line 17 open to de-energize the relay R2*b* in line 17. However, if before the expiration of the timing interval the down push button switch D in line 16 be operated it immediately energizes its auxiliary relay R1*b* in line 16 so that it closes its contacts R1*b* in line 15 to complete a sealing circuit through timer relay contacts TR*b* and the R1*b* contacts, now closed. This relay R1*b* also opens its contacts R1*b* in line 17 to de-energize the relay R2*b* for the up signal. This relay R2*b* thereupon immediately drops out thus canceling the up signal.

Even though the intending passenger may be holding the up button switch in line 17 closed it has no effect because the circuit to the floor call storing means is broken by the timer relay contacts TR*b* in line 18 and the circuit to the relay R2*b* is broken at the contacts R1*b*. Upon the expiration of the timing interval the TR*b* contacts in line 17, those in series with the up push button switch U, open just before contacts TR*b* in line 18 close. Since the contacts TR*b* in line 17 open first there is no pulse of current supplied to the relay or floor call storing means. At the same time the timer relay TR*b* by opening its contacts in line 15 de-energizes the auxiliary relay R1*b* in line 16. It therefore releases to close its contacts R1*b* in line 19 to energize the timer relay TR*b*. The timer relay TR*b*, in turn, closes its contacts in lines 15 and 17 at the same time or slightly after it opens its contacts in line 18. If the up push button switch U in line 17 is still held closed the relay R2*b* is now energized. It thereupon opens its contacts R2*b* in line 19 to start another timing period at the same time that it seals itself in by way of its contacts in line 18. If the timing interval expires before the down push button D is again operated a circuit will be completed at the expiration of the time interval by the way of the contacts R2*b* in line 18 and the now closing contacts TR*b* in the same line.

This circuit thus offers an additional time interval following the registration of a down call during which unintentional up calls are canceled by the operation of the down push button switch. Thus at least one complete timing interval of the timing relay must elapse after the registration of a down call before an up call may be transmitted through to the up call storing means.

Each of these circuits provides means for giving preference to calls in a given direction when the buttons are pressed simultaneously or in rapid succession. The second and third circuits shown in Figures II and III give preference to the down calls or those in the heavy traffic direction regardless of the order in which the buttons are pushed. The first circuit with the auxiliary switch S open gives preference to the first button to be pushed regardless of whether it be an up call or a down call.

In each of the foregoing circuits electrical timing means are employed. Figure IV shows a circuit in which pneumatic timing means, an example of the general class of pneumatic, hydraulic or similar devices, is employed to time an interval following the registration or operation of each push button switch before the circuits are completed or conditioned for reception of signals for the opposite direction. In Figure IV an up floor call storing means 20 may be energized from leads L10 and L11 by way of contacts 21 of an up push button switch 22 when such switch is in operated condition. The circuit also includes normally closed contacts 23 of a down call push button 24 therefore the circuit cannot be completed unless the up push button switch is operated and the down push button switch is not. Likewise, a down call storing means 25 may be energized from the leads L10 and L11 by way of normally closed contacts 26 of the up push button switch 22, and normally open contacts 27 of the down push button switch 24. Simultaneous operation of the two push button switches results in no signal since each of the circuits is then broken. A pair of dashpots 28 and 29 are attached to the movable push button switch members and arranged to delay the return of the members to normal condition following each operation. During this delayed return the circuit to the other floor call storing means is broken thus requiring a time interval after the operation of either switch before the other may become effective. The time interval may be adjusted by varying the size of orifices 30 in plungers 31 of the dashpots 28 and 29.

In each of the arrangements a timing means is employed to time an interval following the operation of one of the push button switches for registering hall calls and such operation disables, during the timing interval, the circuits to the floor call storing means for opposite direction calls. Thus, a great number of the false calls registered by impatient passengers are intercepted before they are stored in the floor call storing means and thus a great number of stops are avoided and the elevator operation thereby rendered more efficient.

Various modifications of the circuit may be made without departing from the scope of the invention.

Having described the invention, we claim:

1. In a control circuit for registering floor calls in an elevator control system, in combination, a pair of floor call storing means operable upon momentary energization thereof, a pair of push button switches one for each call storing means, a pair of relays one for each push button switch, circuit means for connecting each push button switch to its relay, at least one of said circuit means including contacts of the other relay such that the relays cannot be simultaneously energized, holding circuit means for each relay by-passing its push button switch, a timing relay having contacts in series with at least one of the holding circuits for timing the interval that said relays may be held energized by their holding circuits, and circuit means connecting said floor call storing means in parallel with the respective relays.

2. In a control circuit for registering floor calls in an elevator control system, in combination, a pair of floor call storing means that are operable by momentary energization, a pair of push button switches, a pair of relays connected one to each push button switch, contacts of at least one of said relays connected in series circuit with the other relay, a holding circuit for each relay, a time delay relay that is energized through contacts of said relays as long as both relays are de-energized, contacts of said time delay relay included in at least one of said holding circuits to open the holding circuit at the end of the time delay, and circuit means connecting said floor call storing means in parallel with said relays.

3. In a control circuit for registering floor calls in an elevator control system, in combination, a pair of floor call storing means that are operable by momentary energization, a pair of push button switches, a pair of relays one for each push button switch, a time delay relay, circuit means including contacts on each of the relays for energizing the time delay relay when said relays are de-energized, circuit means connecting a first of said relays directly to its push button switch, circuit means including contacts on the first relay for connecting the second of said relays to its push button switch, means connecting a first of said floor call storing means in parallel with the first of said relays, circuit means including contacts of said time delay relay connecting the second floor call storing means to the push button switch of the second relay, circuit means including contacts of the second relay in series with contacts of the time delay relay connected in parallel with the push button switch of the first relay, and circuit means including contacts of the second relay and of the floor call storing means connected in parallel with the push button switch of the second relay.

4. In a control circuit for registering floor calls in an elevator control system, in combination, a first and a second floor call storing means operable to call storing condition by momentary energization, a first and a second relay, a time delay relay, means including contacts of the first and second relays for energizing the time delay relay, a first and a second push button switch, means for connecting the first push button switch to the first relay and the first call storing means, a holding circuit for the first relay including contacts of the first relay and of the time delay relay, an energizing circuit for the second relay that includes at least contacts of the first relay and the second push button switch, a holding circuit for the second relay that includes at least contacts of the second relay and contacts of the second floor call storing means, and an energizing circuit for the second floor call storing means that includes contacts of the time delay relay and contacts operable by operation of the second push button switch.

5. A control circuit for registering floor calls according to claim 4 in which contacts of the floor call storing means and the first relay are common to the energizing and holding circuits of the second relay.

6. A control circuit according to claim 4 in which the second floor call storing means is connected through contacts of the time delay relay to the second push button switch.

7. A control circuit according to claim 4 in which the second floor call storing means is energized through a circuit including contacts of the second relay and contacts of the time delay relay.

8. A control circuit according to claim 4 in which the time delay relay is energized through contacts of a program selector.

9. In a control circuit according to claim 4, an auxiliary relay having its coil connected in a supply lead to indicate the energization of either of the relays.

10. In a control circuit according to claim 4 a signal light for at least the second push button switch, and parallel connected contacts of the second relay and the second floor call storing means connected to control the signal light.

11. In a control circuit for registering floor calls in an elevator system, in combination, a first and a second floor call storing means, a first and a second push button switch, circuit means connecting the push button switches to the call storing means, means responsive to the pushing of one button for interrupting the circuit means between the other button and its call storing means, and time delay means for continuing the interruption of said circuit means for a predetermined period of time.

12. A control circuit according to claim 11 in which at least one push button switch has two sets of contacts, one set for completing a circuit to its call storing means and the other set for interrupting the circuit from the other push button to its call storing means, and a dashpot connected to the push button switch and arranged to delay its return to normal position after having been operated.

References Cited in the file of this patent

UNITED STATES PATENTS

| | | |
|---|---|---|
| 1,697,883 | Quick et al. | Jan. 8, 1939 |
| 2,546,392 | Grupp | Mar. 27, 1951 |
| 2,622,138 | Cooper | Dec. 16, 1952 |